United States Patent
Qureshi et al.

[11] Patent Number: 5,962,603
[45] Date of Patent: Oct. 5, 1999

[54] INTUMESCENT COMPOSITION AND METHOD

[75] Inventors: Shahid P. Qureshi, Duluth; David A. Hutchings, Tucker, both of Ga.

[73] Assignee: Georgia-Pacific Resins, Inc., Atlanta, Ga.

[21] Appl. No.: 08/681,560

[22] Filed: Jul. 23, 1996

[51] Int. Cl.$^6$ .............................. C08K 3/32; C08L 61/34
[52] U.S. Cl. ..................... 525/519; 523/179; 428/502; 428/503; 524/707
[58] Field of Search .............................. 523/179; 525/509, 525/517; 524/707, 597, 130, 131, 124; 428/502, 503; 562/11, 14

[56] References Cited

U.S. PATENT DOCUMENTS

| | | |
|---|---|---|
| Re. 32,812 | 12/1988 | Lemon et al. . |
| 2,599,807 | 6/1952 | Bersworth .................... 564/16 |
| 2,609,390 | 9/1952 | Bersworth . |
| 2,841,611 | 7/1958 | Bersworth .................... 564/16 |
| 2,993,067 | 7/1961 | Magerlein et al. ............ 260/461 |
| 3,121,697 | 2/1964 | Girard et al. .................. 260/2 |
| 3,234,140 | 2/1966 | Irani ........................... 252/186 |
| 3,298,956 | 1/1967 | Irani et al. ................... 562/14 |
| 3,341,340 | 9/1967 | Sawyer et al. ................ 106/72 |
| 3,395,113 | 7/1968 | Irani et al. ................... 524/124 |
| 3,422,046 | 1/1969 | Thomas et al. . |
| 3,423,369 | 1/1969 | Nachbur et al. ............... 525/517 |
| 3,440,201 | 4/1969 | Sempert et al. . |
| 3,470,112 | 9/1969 | Irani et al. . |
| 3,483,178 | 12/1969 | Crutchfield et al. ............ 260/140 |
| 3,562,197 | 2/1971 | Sears et al. . |
| 3,932,303 | 1/1976 | Hollinghad . |
| 3,983,098 | 9/1976 | Bussi et al. . |
| 4,026,711 | 5/1977 | Weyker et al. . |
| 4,061,695 | 12/1977 | Tai et al. . |
| 4,100,231 | 7/1978 | Tai et al. . |
| 4,198,328 | 4/1980 | Bertelli et al. . |
| 4,210,452 | 7/1980 | Nicholson et al. . |
| 4,221,837 | 9/1980 | Nicholson et al. . |
| 4,226,907 | 10/1980 | Sienkowski et al. . |
| 4,246,157 | 1/1981 | Laitar . |
| 4,256,844 | 3/1981 | Martin et al. . |
| 4,331,583 | 5/1982 | Everett . |
| 4,338,209 | 7/1982 | Manabe et al. . |
| 4,339,357 | 7/1982 | Nicholson et al. . |
| 4,370,442 | 1/1983 | Pearson . |
| 4,404,297 | 9/1983 | Fishler et al. . |
| 4,404,313 | 9/1983 | Leitner ....................... 524/124 |
| 4,442,157 | 4/1984 | Marx et al. . |
| 4,505,748 | 3/1985 | Baxter . |
| 4,599,369 | 7/1986 | Malcolm-Brown . |
| 4,632,946 | 12/1986 | Muench et al. . |
| 4,636,538 | 1/1987 | Malcolm-Brown . |
| 4,645,782 | 2/1987 | Redfarn . |
| 4,661,280 | 4/1987 | Ouhadi et al. . |
| 4,662,173 | 5/1987 | Broze et al. . |
| 4,671,934 | 6/1987 | Terry et al. . |
| 4,751,320 | 6/1988 | Masuda et al. . |
| 4,774,268 | 9/1988 | Marx et al. . |
| 4,786,431 | 11/1988 | Broze et al. . |
| 4,857,364 | 8/1989 | von Bonin . |
| 4,927,550 | 5/1990 | Cutcher et al. . |
| 4,965,296 | 10/1990 | Hastings . |
| 4,983,654 | 1/1991 | Cheung et al. . |
| 4,994,581 | 2/1991 | Takeda et al. . |
| 5,002,126 | 3/1991 | Carlberg et al. . |
| 5,003,036 | 3/1991 | Crompton et al. . |
| 5,057,238 | 10/1991 | Broze et al. . |
| 5,094,780 | 3/1992 | von Bonin . |
| 5,152,177 | 10/1992 | Buck et al. . |
| 5,173,515 | 12/1992 | von Bonin et al. . |
| 5,182,049 | 1/1993 | von Bonin . |
| 5,196,070 | 3/1993 | Ables et al. . |
| 5,356,568 | 10/1994 | Levine . |
| 5,387,655 | 2/1995 | Aslin . |
| 5,430,081 | 7/1995 | Ohmae et al. . |
| 5,596,029 | 1/1997 | Goebelbecker et al. . |

FOREIGN PATENT DOCUMENTS

| | | |
|---|---|---|
| 0 138 546 | 4/1985 | European Pat. Off. . |
| 0 139 401 | 5/1985 | European Pat. Off. . |
| 0 449 689 A1 | 10/1991 | European Pat. Off. . |
| 614944 | 9/1994 | European Pat. Off. . |
| 755551 | 8/1956 | United Kingdom . |
| 812390 | 4/1959 | United Kingdom . |
| 1176684 | 1/1970 | United Kingdom . |
| 2007689 | 5/1979 | United Kingdom . |
| 2 012 296 | 7/1979 | United Kingdom . |
| 1601884 | 11/1981 | United Kingdom . |
| 1604657 | 12/1981 | United Kingdom . |
| 1604908 | 12/1981 | United Kingdom . |
| 2 151 237 | 7/1985 | United Kingdom . |
| 2151237 | 7/1985 | United Kingdom . |
| WO 86/00915 | 2/1986 | WIPO . |

*Primary Examiner*—Veronica P. Hoke
*Attorney, Agent, or Firm*—Banner & Witcoff, Ltd.

[57] ABSTRACT

An aqueous composition containing an acid-hardenable melamine-formaldehyde resin and a nitrogen-containing acidic phosphorus curing agent made from either phosphoric acid or phosphorous acid which is curable to an intumescent composition.

25 Claims, No Drawings

INTUMESCENT COMPOSITION AND METHOD

BACKGROUND OF THE INVENTION

1. Field of the Invention

This invention broadly relates to a composition useful for imparting fire resistance to a variety of substrates, such as materials used in the building and construction industry. More particularly, this invention provides an aqueous composition containing as essential components an acid-hardenable melamine-formaldehyde resin W resin) and an acidic curing agent selected from a particular class of nitrogen-containing acidic phosphorus compounds made from either phosphoric acid or phosphorous acid. After curing, this composition acts as an intumescent and imparts fire resistance to substrates treated with the composition.

2. Description of Related Art

Intumescent coatings are commonly applied to the surface of construction materials. Such coatings serve, for example, to prevent the spread of fire. Intumescent coatings are also applied to the surface of other flammable substrates, to reduce their flammability. U.S. Pat. No. 4,198,328 for example, describes an intumescent paint which includes a source of phosphoric acid, a carbon source and an expanding agent. These components are bound together by a conventional polymeric binder. Binders have included acrylic styrene or vinyl toluene copolymer, a styrene or vinyl toluene-butadiene-copolymer, a styrene or vinyltoluene-acrylonitrile-copolymer polyurethane resins, alkyl resins and the like. Alternatively, polyvinyl alcohol, polyvinyl acetate, polyvinyl butyral, urea or melamine-formaldehyde resins and vinyl chloride-vinylidene chloride copolymers have been used. The use of epoxy resins in combination with various amino-functional curing agents also is known. In all of these formulations chlorinated paraffins or optionally chlorinated phosphate esters may be employed as plasticizers.

Other intumescent systems are also known. GB-A-2,151,237 discloses water-insoluble formulations which contain chlorinated polymers, novolak resin and chlorinated or phosphorylated plasticizers. GB-A-2,012,296 describes a three-layer intumescent paint which uses as the intermediate layer formulations which contain expandable graphite, hydrated alumina and binder systems based on halogenated elastomers and alkyl phenol-formaldehyde resins. The binder, in concert with a silicate top coating, functions to prevent the expanded graphite from crumbling and cracking. GB-A-1,604,908 mentions products with vermiculite and inorganic fibers as filler as well as elastomeric binders and clay.

Intumescent, fire resistant compositions act by forming an expanded, insulating layer of a hardly flammable material under the action of heat. The expanded layer shields the substrate from oxygen and/or from overheating and thereby prevents or delays the spread of flame, and prevents or at least delays reductions in the mechanical and static properties of structural supporting elements caused by heat.

A greater expansion (intumescence) produces thicker protective layers, but at the same time the thicker layers, generally due to their reduced mechanical stability, often are more easily detached from the substrate thus becoming less effective.

Conventional intumescent systems consist of a binder of the above type including urea-formaldehyde resins and melamine-formaldehyde resins, a char or carbon skeleton forming substance (typically referred to as "carbonific"), an expanding agent (typically referred to as "spumific") and an acid forming substance as essential components. As carbonifics, organic polyhydroxy compounds such as pentaerythritol, dipentaerythritol, tripentaerythritol, starch and sugars have been employed. Examples of spumifics are nitrogen-containing compounds such as melamine, melamine salts, melamine derivatives, urea, dicyandiamide and guanidine. The spumific effects the formation of a foamed (intumescent) layer by emission of an inert gas. As acid forming substances usually an aminophosphate, mainly ammonium phosphates and amine phosphates, preferably ammonium polyphosphate, and melamine phosphate, have found use. Examples of further additives are inorganic fibers which are to increase the mechanical strength of the intumescent layer and/or to prevent the dripping thereof, and metal oxides which act as smoke suppressants. Typical examples of such compositions can be found in U.S. Pat. Nos. 4,442,157, 4,638,538, 3,562,197, and GB-A-755,551.

Upon exposure to a flame, an intumescent composition swells up with the formation of a foam which repels the action of the fire. Many intumescence compositions, used, for example, as fire-preventive coatings or fire-preventive cements, on exposure to a flame form carbonization foams, because they contain, as intumescence media, carbohydrates or phenolic, polyurethane or melamine resins in combination with a phosphoric acid donor. Inorganic materials, for example alkali metal silicates containing water, can also foam up on exposure to a flame, and also are employed for the purposes of fire prevention. However, since these silicates are sensitive to air, moisture and/or $CO_2$, they can only be used to a limited extent as intumescence media.

In most organic-compound based intumescence compositions, carbonisable compounds in combination with phosphorus compounds act as the intumescence media. The carbonization foams formed on exposure to a flame have, however, only a low mechanical strength, put up only a low resistance to flame erosion and are degradable by oxidation. Organic fire-preventive materials of this type can also contain aluminum hydroxide, the function of which is to assist the foaming up of the carbonization melt by splitting off water under the influence of heat, and to carry off heat.

The carbonization of organic melts is promoted by phosphorus compounds which liberate phosphoric acid. As noted above, ammonium phosphates are therefore frequently employed as phosphoric acid donors, but their good solubility in water has often been considered a disadvantage.

There is, therefore, still a need for intumescence compositions which are not degradable by oxidation, which are insensitive towards air, moisture and $CO_2$, which upon exposure to a flame become effective and form as far as possible an intumescent foam having mechanical stability.

Accordingly it is an object of the present invention to provide a composition having integrated intumescent properties which avoids or at least alleviates disadvantages of conventional prior art intumescent systems described above.

Compliance with various fire resistance testing methods is an important consideration in developing fire resistant compositions because many regulatory agencies and building codes rely on these tests in determining the acceptance of building materials used in various applications. Insurance rates may also be affected by compliance with fire resistance testing methods. In the present invention, fire resistance of the composition was determined in part using the Cone Calorimetric Test (ASIM E1354), the Tunnel Test (ASTM E-84), the Heat Release Test (ASTM E-906 and the Smoke Test (ASTM E-662).

BRIEF DESCRIPTION OF THE INVENTION

In a first aspect, the present invention is directed to an intumescent composition comprising an acid-cured melamine-formaldehyde resin wherein said resin is cured using a nitrogen-containing, acidic phosphorus curing agent.

The invention also relates to an aqueous composition suitable for imparting fire resistance to a substrate, such as by coating or impregnating the substrate with a nascent intumescent composition, said aqueous composition comprising a water soluble, acid-curable melamine-formaldehyde resin and the above noted nitrogen-containing acidic phosphorus curing agent.

In accordance with yet another aspect of the invention, a substrate is rendered fire resistant by treating said substrate with an aqueous composition comprising the water soluble, acid-curable melamine-formaldehyde resin and the nitrogen-containing acidic phosphorus curing agent and then curing said resin. The resultant fire resistant article, comprising the substrate coated or impregnated with the acid-cured melamine-formaldehyde resin, wherein the resin is cured using the acidic phosphorus curing agent of the present invention, also forms part of the present invention.

DETAILED DESCRIPTION OF THE INVENTION

In accordance with the present invention, a intumescent composition is prepared by curing an aqueous, acid-curable melamine-formaldehyde resin with a nitrogen-containing acidic phosphorus curing agent. Suitable nitrogen-containing acidic phosphorus curing agents contain one or more moieties of the following formula:

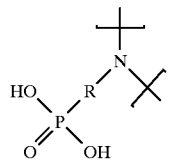

where R is selected from a $C_1$ to $C_6$ alkylene radical, a $C_3$ to $C_7$ cycloalkylene radical, an arylene radical and a divalent radical of the formula:

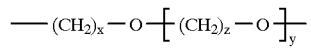

where x and z are integers of 1 to 6, and y is an integer from 0 to 2 and wherein the divalent radical is bonded to the phosphorous atom of said moieties through the terminal oxygen atom of said radical.

One preferred class of such nitrogen-containing acidic phosphorus curing agents includes compounds of the following formula:

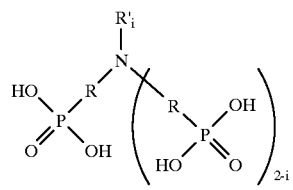

where R is selected from a $C_1$ to $C_6$ alkylene radical, a $C_3$ to $C_7$ cycloalkylene radical, an arylene radical and a divalent radical and where i is either 0 or 1, and R' is selected from hydrogen, a $C_1$ to $C_6$ alkyl, a $C_1$ to $C_6$ alkoxy, a cycloalkyl, and an aryl of the formula:

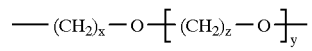

where x and z are integers of 1 to 6, and y is an integer from 0 to 2 and wherein the divalent radical is bonded to the phosphorous atoms of said compound through the terminal oxygen atom of said radical.

Another class of nitrogen-containing, acidic phosphorus curing agents includes compounds of the formula:

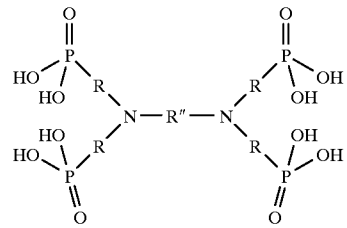

where R" is a divalent organic radical, such as an alkylene group having from 1 to 12 carbon atoms and R has the same meaning noted above.

Yet another class of nitrogen-containing, acidic phosphorus curing agent has the formula:

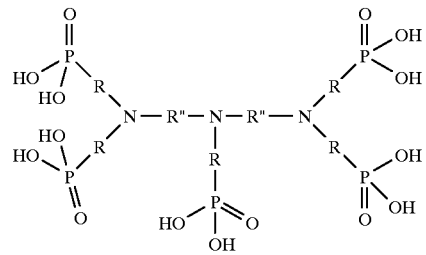

where R and R" have the same meanings as above.

Melamine-formaldehyde (MF) resins suitable for preparing the intumescent composition of the present invention are well known to those skilled in the art. Such resins can be prepared using known techniques by reacting melamine and formaldehyde in an aqueous reaction medium at a melamine to formaldehyde mole ratio in the range of 1:1 to 1:6. Preferably, the melamine:formaldehyde mole ratio is in the range of 1:2 to 1:4. In the broad practice of the present invention, standard reaction conditions, procedures and reactants widely used for preparing aqueous melamine-formaldehyde resins that can be cured to an infusible state with an acid catalyst can be used.

The resin is generally prepared by adding melamine to an aqueous formaldehyde solution. Normally, the reaction is conducted, at least initially, at an alkaline pH, a pH normally of 7 to 10 typically being satisfactory, and at a temperature in the range of 50°–100° C., more usually at 60°–90° C. A variety of techniques are known in the art for reacting melamine and formaldehyde in the presence of an alkaline catalyst. Oftentimes, the resin is reacted in stages with separate partial additions of either one or both of the reactants and the alkaline catalyst. In the broad practice of the present invention, however, any process for producing an acid-curable MF resin can be advantageously employed.

Formaldehyde useful for preparing the resin generally is supplied as an aqueous solution known in the art as "formalin". Formalin is an aqueous solution that typically contains from about 37% to about 50% by weight formaldehyde. Other forms of formaldehyde such as paraformaldehyde also can be used. Other aldehydes, which may be used in combination with formaldehyde to introduce specific properties into the MF resin, include aliphatic aldehydes such as acetaldehyde and propionaldehyde; aromatic aldehydes such as benzylaldehyde and furfural and other aldehydes such as aldol, glyoxal and crotonaldehyde, also can be used. Similarly, a portion of the melamine could be replace by other amninotriazines such as dicyanadiamide and benzoguanamine.

Suitable melamine-formaldehyde resins also include methylated melamine resins and resins which have been modified with aromatic glycidyl ethers and/or cycloaliphatic epoxides. Specific examples of modifiers of said type are 3,4-epoxycyclohexyl-methyl-3,4-epoxycyclohexanecarboxylate and bisphenol-A-diglycidylether. These modifications may increase the strength of the cured composition and in the event of fire may result in an increased adhesion of the intumescent layer to the protected substrate. Preferably, the modifiers mentioned above are used in an amount such that they account for no more than about 1 to 15% by weight of the MF resin.

Sodium hydroxide generally is the alkaline catalyst of choice for synthesizing such melamine-formaldehyde resins. A non-limiting list of other potential alkaline catalysts includes, inter alia, other alkali metal hydroxides such as potassium hydroxide, alkali metal carbonates such as sodium and potassium carbonates, and alkaline earth metal oxides and hydroxides such as barium hydroxide, calcium hydroxide and calcium oxide. Organic amines also can be used in the broad practice of the invention.

Acid-curable melamine-formaldehyde resins useful in practicing the present invention, including water soluble MF resin powders, normally made by neutralizing and then spray-drying an aqueous MF resin solution, are items of commerce. Suitable commercial aqueous MF resin solutions and powdered MF resins for practicing the present invention are available, for example, from Cytec, BTL and Hoechst Celanese companies.

In the broad practice of the present invention, it also is possible to blend other acid-curable resins with the acid-curable melamine-formaldehyde resin component to provide certain property modifications to the base MF resin. For example, minor amounts of phenol-formaldehyde resins and urea-formaldehyde resins can be included in the aqueous composition as modifiers. Normally, the total amount of such resin additives will be 50% or less, normally 30% or less, and most often 20% or less of the solids content of the aqueous composition.

The other essential constituent of the composition of the present invention is the nitrogen-containing, acidic phosphorus curing agent. Suitable nitrogen-containing acidic phosphorus curing agents contain one or more moieties of the following formula:

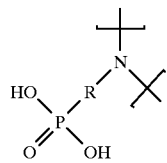

where R is selected from a $C_1$ to $C_6$ alkylene radical, a $C_3$ to $C_7$ cycloalkylene radical, an arylene radical and a divalent radical of the formula:

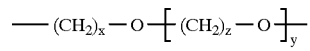

where x and z are integers of 1 to 6, and y is an integer from 0 to 2 and wherein the divalent radical is bonded to the phosphorous atom of said moieties through the terminal oxygen atom.

One preferred class of such nitrogen-containing acidic phosphorus curing agents includes compounds of the following formula (I):

(I)

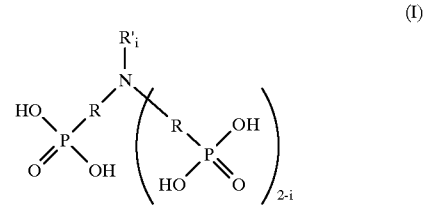

where R is selected from a $C_1$ to $C_6$ alkylene radical, a $C_3$ to $C_7$ cycloalkylene radical, an arylene radical and a divalent radical of the formula:

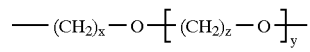

where x and z are integers of 1 to 6, and y is an integer from 0 to 2 and wherein the divalent radical is bonded to the phosphorus atoms of said compound through the terminal oxygen atom of said radical and where i is either 0 or 1, and R' is selected from hydrogen, a $C_1$ to $C_6$ alkyl, a $C_1$ to $C_6$ alkoxy, a cycloalkyl, and an aryl.

Another class of nitrogen-containing, acidic phosphorus curing agents includes compounds of the formula (II):

(II)

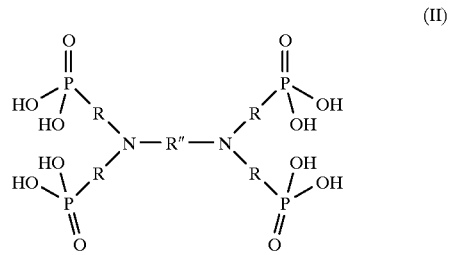

where R" is a divalent organic radical, such as an alkylene group having from 1 to 12 carbon atoms and R has the same meaning noted above.

Yet another class of nitrogen-containing, acidic phosphorus curing agent has the formula (III):

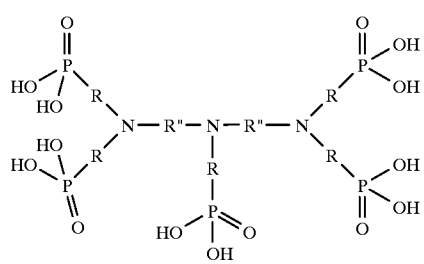
(III)

where R and R" have the same meanings as above.

One subclass of such curing agents can be prepared by reacting (partially neutralizing) orthophosphoric acid ($H_3PO_4$) with an alkanol amine, and particularly a di- or tri-alkanol amine. Suitable alkanol amines may have the formula:

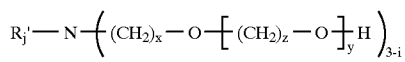

where i is either 0 or 1, R' is selected from hydrogen, a $C_1$ to $C_6$ alkyl, a $C_1$ to $C_6$ alkoxy, a cycloalkyl, and an aryl, x and z are integers of 1 to 6, y is an integer from 0 to 2.

Phosphoric acid equivalents such as pyrophosphoric acid (which is equivalent to 105% orthophophoric acid), tetraphosphoric acid (which is equivalent to 115% orthophosphoric acid) or phosphorus pentoxide (which is equivalent to 138% orthophosphoric acid) also may be used as the phosphoric acid source.

Such alkanol amines are commercially available and include dimethanolamine, diethanolamine, dipropanolamine, dibutanolamine, trimethanolamine, triethanolamine, tripropanolamine, tributanolamine and the alkylene oxide adducts of these alkanolamines such as their ethylene oxide and propylene oxide adducts.

Acidic phosphorus curing agents prepared in this manner from trialkanolamines and such adducts may have the following formula (IV):

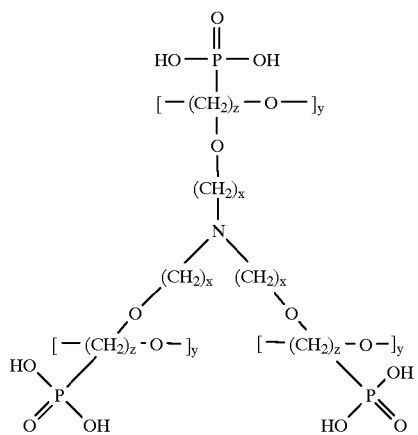
(IV)

where the oxygen of the alkylenoxy is bonded to the phosphorus and where x, y and z have the same meanings defined above.

A particularly preferred nitogen-containing, acidic phosphorus curing agent is the one prepared by neutralizing ortho-phosphoric acid with trimethanolamine, triethanolamine, tripropanolamine and the like. These preferred curing agents have the formula (V):

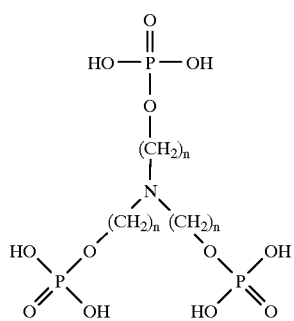
(V)

where n is an integer of 1 to 4.

The neutralization adduct of triethanolamine (TEA) and phosphoric acid in an amount of three moles of acid per mole of TEA is known in the art and is commercially available as aminotriethanol phosphate or ATP. For example, ATP is available commercially from P. Chem, Inc., Latexo, Tex. The reaction product is basically considered a triester of TEA and has an acid number of 510–525. ATP has the following formula:

A second class of nitrogen-containing acidic phosphorous curing agents useful in the practice of the present invention, generally referred to as phosphonates, can be prepared by reacting phosphorus acid, formaldehyde and ammonia or a primary or secondary amine through a phosphonomethylation reaction among the ammonia or amine, formaldehyde and phosphorus acid. Hydrochloric acid may be added to the reaction mixture to suppress the oxidation of phosphite to phosphate.

A diphosphonic acid of the formula (VI):

(VI)

where R' is a monovalent organic radical, preferably a substituted or unsubstituted alkyl group having 1 to 6 carbon atoms such as propyl, isopropyl, butyl, hexyl or 2-hydroxyethyl, can be prepared from a primary amine. An example of a tri-phosphonic acid is aminotris(methylene-phosphonic acid) (ATMP) made by reacting ammonia, formaldehyde and phosphorous acid. ATMP has the formula:

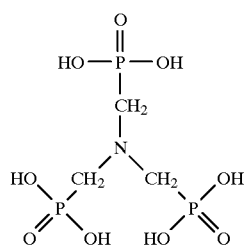

ATMP also is commercially available from P. Chem, Inc. Examples of tetra-phosphonic acids $R(PO_3H_2)_4$ are the alkylene diamine tetra(methylene-phosphonic acids) of the formula (VII):

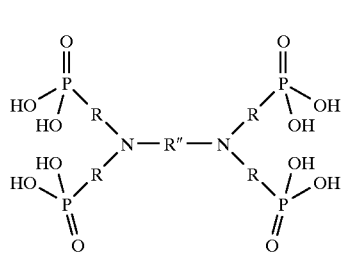

(VII)

where R" is a divalent organic radical, such as an alkylene group having from 1 to 12 carbon atoms, and R is as defined above. One example is ethylene diamine tetra(methylene phosphonic acid). Examples of pentaphosphonic acids, $R(PO_3H_2)_5$ are the dialkylene triamine penta(methylene phosphonic acids of the formula (VIII):

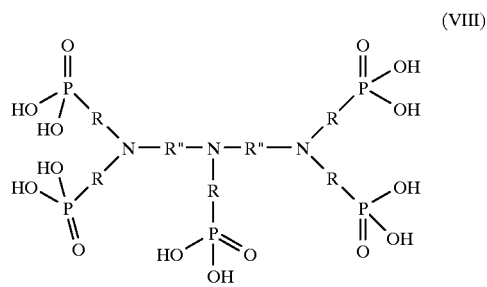

(VIII)

where R and R" are as defined above. For example, such pentaphosphonic acids include diethylene triamine penta (methylene phosphonic acid) of the formula:

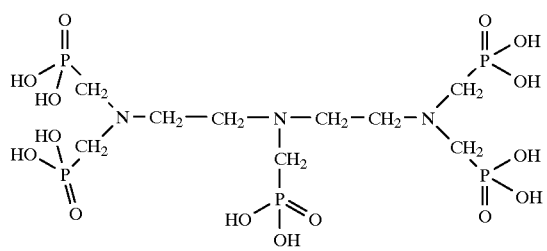

and bis hexamethylene triamine penta(methylene phosphonic acid) of the formula:

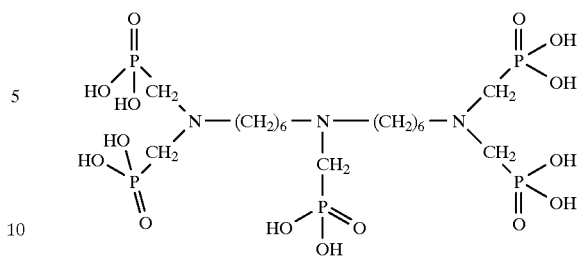

These nitrogen-containing acidic phosphorus curing agents also are commercially available from P. Chem as IS-32 and IS-22 respectively.

The acid curing agent of the present invention is added to the MF resin in an amount sufficient to cause the MF resin to cure at a desired rate and at a desired temperature. Normally, the acid curing agent will be added in an amount of 20 to 100 weight percent curing agent solids based on the weight of the MF resin solids, preferably from 30 to 70 weight percent. Although not preferred, other acid curing agents, such as the organo-sulfonic acids, also could be included in forming the intumescent composition. To facilitate uniform blending of the MF resin and acidic phosphorous curing agent, the acid curing agent often is added to an aqueous solution of the resin itself as a dilute aqueous solution containing between about 1 to 30% by weight of the acidic curing agent. The solution may also contain additional solvents such as ethylene glycol and n-butanol. Generally, the acid curing agent is added in an amount to yield a phosphorus content in the ultimately cured MF resin of at least about 5% by weight of the MF resin, and particularly at least about 10% by weight. Normally, the phosphorus content of the cured resin will not exceed about 30% by weight.

Although the compositions of the present invention, as such, produce an intumescent effect, it may be advantageous under certain circumstances to incorporate additional intumescent adjuvants in the composition, e.g., in order to increase the rising rate of the intumescent layer or to decrease the density thereof. Such intumescent material additives are usually employed in an amount sufficient to provide up to 5 to 50 grams of the additive per square foot of area to be treated with the MF resin/acid curing agent mixture. Such materials may include polyalcohols, swellable micas, swellable graphites, silicates, borates and/ or synthetic borosilicates. Such components are usually present in the composition in an amount of 15% to 50% by weight of the MF resin solids.

In this connection, the invention performs particularly well using a combination of the intumescence composition of the present invention and a swellable graphite, for example a graphite compound which contains expansive molecules in the interstitial lattice planes such as an acid, halogen, $NO_x$ and/or $SO_x$ and which expand, on heating to approx. 150° to 600° C., to several times their initial volume. Mixtures of different types of expandable graphites can also be used. A particularly useful intumescent additive in this regard is Grafoil® graphite flake available from UCAR Carbon Co., Inc.

If appropriate, additional binders and the usual fillers can also be used in connection with the present invention. As noted above, such binders may include other resinous compositions such as phenol-formaldehyde (PF) and urea-formaldehyde (UF) resins. Examples of fillers which can be used are chalk, asbestos, metal powders, metal oxides, metal hydroxides, silicates, carbon, powdered rock, mineral fibers, glass, slags, filter dusts and ashes. The fillers optionally can be added in quantities of, for example, 0 to 30% by weight, preferably 0 to 10% by weight (relative to the MF resin solids).

The aqueous composition of the present invention has particular use as a composition for coating a variety of substrates for imparting fire resistant characteristics. In the broad practice of the invention, however, the aqueous composition also can be used as a fire resistant binder or adhesive. For example, it is also possible to compress mixtures of the aqueous composition according to the present invention with wood shavings to give chipboard having an intumescent binder. The aqueous composition according to the invention is equally suitable as an adhesive binder for sheets and moldings of glass and mineral wool.

Conventional pigments may also be added to the compositions according to the present invention, the total amount thereof usually not exceeding 5 to 50%, particularly 10 to 40% by weight of the total weight of the MF resin solids. As pigments, all substances which are employed in conventional intumescent compositions and which preferably are of mineral (inorganic) nature are suitable. Examples of such pigments are titania and carbon black. The pigments may be added to the MF resin before combining it with the nitrogen-containing acidic phosphorous curing agent or thereafter. Preferably, the addition is carried out before combining the MF resin and nitrogen-containing acidic phosphorous curing agent components.

The compositions according to the present invention are preferably present in a form suitable for coating and impregnation purposes, for example as an aqueous or water-containing solution or as a dispersion. The water content of the composition depends on the amount and the nature of the components employed, but preferably is not higher than about 80% by weight of the total composition including water. Normally, the total solids content of the aqueous composition is between about 20 and 90% by weight with compositions having a solids content above about 50% and more usually above 60%, depending on the intended application, generally being preferred. As used herein, the solids content of a composition is measured by the weight loss upon heating a small, e.g., 1–5 gram, sample of the composition at about 135° C. for about 2 hours.

Compositions according to the present invention are preferably employed for coating articles made of wood, plastic (including plastic composites and plastic foams), cellulosic materials, rubber and metal, for the impregnation of textiles and as noted above as an intumescent binder or adhesive for such materials. The application of the composition may be carried out according to any conventional method, e.g. by spraying, dipping, drawing and brushing. The coating process may optionally be repeated several times. The coating thickness may vary within a wide range, depending on the viscosity of the composition and the substrate to be coated. Conventional coating thicknesses range from $10\mu$ to 3 mm.

A particularly preferred application for compositions of the present invention are for treating fiber reinforced plastic (FRP) composites, particularly FRP composites designed for the interior of aircrafts. Such composites typically are based on the use of thermoset resins (e.g., epoxy resins, phenolic resins and the like) and employ a variety of reinforcing fibers (e.g., glass, carbon, Kevlar®) and Nomex® honeycomb. Current FRP panels for the interior walls and ceilings are based on phenolic FRP's because they meet OSU heat release requirements (<65/65) and smoke requirements (<20 @ 4 minutes), per FAA guidelines. FRP panels used in floors are generally based on epoxy resins due to thier excellent adhesion with Nomex® and current smoke specifications still allow for the use of epoxy resins (<200 @ 4 minutes). The present invention, as illustrated specifically in Examples 7–11 hereinafter, provides a way for improving the behavior of these epoxy panels, relative to the smoke specification, to a level similar to the current properties for phenolic FRP's.

The curing of the composition (e.g., as a coating) is preferably carried out at room temperature, although said curing can also be carried out at an elevated temperature, often a slightly elevated temperature (preferably up to about 60° C.) will be sufficient, depending on the nature of the components employed.

EXAMPLES

In order to facilitate a more complete understanding of the invention, a number of Examples are provided below. However, the scope of the invention is not limited to specific embodiments disclosed in these Examples, which are for purposes of illustration only.

In some of the following examples, the usefulness of various compositions as an intumescent coating were evaluated using the Cone Calorimeter test (ASTM E1354). In this test, heat is applied using a heat flux of a specified intensity generated by a conical radiant heater directed onto an insulated 4 inch by 4 inch test specimen. The parameters which can be monitored include (1) the time to initial ignition of the sample, (2) the heat release rate, (3) the total heat released, (4) the effective heat of combustion and (5) the weight loss of the sample. In the actual tests reported below, the respective compositions were coated onto specimens of oriented strand board (OSB). An uncoated OSB specimen exhibited a time to ignition ($T_{ig}$) of approximately 50 seconds.

COMPARATIVE EXAMPLE 1

A commercial liquid melamine-formaldehyde/phenol formaldehyde resin marketed by Burke-Hall Coatings (BHC) was mixed with an equal amount of a commercial phosphate ester, Budit-380, commercially available from Chemische Fabrik Budenheim and believed to be a partial ester of a polyol (e.g. pentaerthrytol) and phosphoric acid as disclosed in U.S. Pat. No. 5,387,655. The composition contained at least 10% phosphorus by weight. The mixture then was coated on a 4 inch by 4 inch square of OSB to provide a coating weight of 2 grams.

COMPARATIVE EXAMPLE 2

A commercial liquid melamine-formaldehyde/phenol-formaldehyde resin marketed by Burke-Hall Coatings (BHC) was mixed with an equal amount of the commercial phosphate ester, Budit-380 commercially available from Chemische Fabrik Budenheim, and with an equal amount of Grafoil® (expandible graphite) flake marketed commercially by UCAR Carbon Company, Inc. The composition contained about 8% phosphorus by weight. The mixture then was coated on a 4 inch by 4 inch square of OSB to provide a coating weight of 3 grams.

EXAMPLE 1

A commercial liquid melamine-formaldehyde/phenol-formaldehyde resin marketed by Burke-Hall Coatings (BHC) was mixed with an equal amount aminotriethanol-phosphate acidic phosphorus curing agent (ATP). The composition contained about 6% phosphorus by weight. The mixture then was coated on a 4 inch by 4 inch square of OSB to provide a coating weight of 2 grams.

EXAMPLE 2

A commercial liquid melamine-formaldehyde/phenol-formaldehyde resin marketed by Burke-Hall Coatings (BHC) was mixed with an equal amount aminotriethanolphosphate acidic phosphorus curing agent (ATP) and with an equal amount of Grafoil® (expandible graphite) flake marketed commercially by UCAR Carbon Company, Inc. The composition contained about 5% phosphorus by weight. The mixture then was coated on a 4 inch by 4 inch square of OSB to provide a coating weight of 3 grams.

EXAMPLE 3

The coating composition of EXAMPLE 1 was repeated except that the relative amount (weight ratio) of the BHC resin to the ATP was increased from 1:1 to 3.6:1. The composition contained about 5% phosphorus by weight. The mixture then was coated on a 4 inch by 4 inch square of OSB to provide coating weight of 2 grams.

EXAMPLE 4

CONE CALORIMETER TESTS (CCT)

The OSB specimens coated with the compositions of Comparative Examples 1 and 2 and Examples 1, 2, and 3 were tested for their performance in the CCT. The composition of each sample is reported in Table 1 and the test results are presented below in Table 2.

TABLE 1

COMPOSITIONS OF COATING SAMPLES
COMPONENT PERCENT IN COATING

| Example | Budit – 380 | ATP | BHC | Grafoil (6) | Coating wt. (gms) |
|---|---|---|---|---|---|
| Comp. Ex. 1 | 50 |  | 50 | 0 | 2.0 |
| Comp. Ex. 2 | 33.3 |  | 33.3 | 33.3 | 3.0 |
| Ex. 1 |  | 50 | 50 | 0 | 2.0 |
| Ex. 2 |  | 33.3 | 33.3 | 33.3 | 3.0 |
| Ex. 3 |  | 22 | 78 | 0 | 2.0 |

EXAMPLE 4

A commercial powdered (spray-dried) melamine-formaldehyde resin marketed by Cytec as Aerotru-19 (34.7 wt. %) was mixed with water (10.5 wt. %), n-butanol (2.4 wt. %), a commercial liquid acid curable PF resin from Georgia-Pacific Resin's, Inc. (GP637D52) (2.4 wt. %) and aminotriethanolphosphate acidic phosphorus curing agent (ATP) (50 wt. %). The composition contained about 8% phosphorus by weight. The mixture then was applied as a coating in an amount of about 27 grams of aqueous coating per square feet on 4 ft.×8 ft. panels of OSB and fiberboard. The coated products were tested (E-84 Tunnel Tester). The test results are reported in Table 3.

EXAMPLE 5

A commercial powdered (spray-dried) melamine-formaldehyde resin marketed by Cytec as Aerotru-19 (21.9 wt. %) was mixed with water (6.4 wt. %), n-butanol (1.5 wt. %), a commercial liquid acid cuable PF resin (GP637D52) (1.5 wt. %), aminotriethanolamine acidic phosphorus curing agent (ATP) (29.5 wt. %) and Grafoil® expandable graphite flakes (30.3 wt. %). The composition contained about 6% phosphorus by weight. The mixture then was applied as a coating in an amount of about 27 grams of aqueous coating per square feet on 4 ft.×8 ft. panels of OSB and fiberboard. The coated products were tested (E-84 Tunnel Tester). The test results are reported in Table 3.

TABLE 3

E-84 Tunnel Test Results for Coted OSB
and Sound Deadening Fiberboard Panels

| Example | Panel | Flame Spread Index | Smoke Development |
|---|---|---|---|
| Ex. 4 | OSB | 10 | 100 |
| Ex. 5 | OSB | 5 | 20 |
| Ex. 4 | Fiberboard | 20 | 185 |
| Ex. 5 | Fiberboard | 10 | 40 |

EXAMPLE 6

Using the compositions of Examples 4 and 5, Underwriter Laboratories small scale fire tests were conducted on hardboard. Table 4 illustrates the aqueous coating weight on the hardboard samples and the test results. An uncoated control board also was tested.

TABLE 2

CONE CALORIMETER TEST RESULTS

| Example | Ext. Ht. Flux, (kW/m$^2$) | $T_{ig}$, (sec) | Peak HRR, (kW/m$^2$) | Time to Peak, (sec) | Ave. HRR Ign. + 60 sec. (kW/m$^2$) | THR, (kJ) | Eff. Hc, (MJ/kg) | Ave. Spec. Extn. Area, (m$^2$/kg) | Initial Mass, (g) | Mass Loss, (g) | Mass* Loss, (%) |
|---|---|---|---|---|---|---|---|---|---|---|---|
| Comp. Ex. 1 | 35 | 203 | 66.7 | 350 | 43.91 | 202 | 7.3 | 34.2 | 87.5 | 27.6 | 31.5 |
| Comp. Ex. 2 | 35 | 443 | 36.6 | 557 | 17.12 | 50 | 3.7 | 6.0 | 88.9 | 13.5 | 15.2 |
| Ex. 1 | 35 | 644 | 61.5 | 720 | 21.9 | 39 | 7.3 | 44.9 | 82.9 | 5.4 | 6.5 |
| Ex. 2 | 35 | 990 | 41.8 | >999 | 11.67 | 59 | 3.3 | 22.6 | 88.8 | 17.9 | 20.2 |
| Ex. 3 | 35 | 189 | 87.7 | 600 | 46.19 | 245 | 8.2 | 31.1 | 82.2 | 298 | 36.3 |

ABBREVIATIONS:

$T_{ig}$  Time to ignition
HRR  Heat Release Rate
THR  Total Heat Released
Eff. Hc  Effective Heat of Combustion
*Mass Loss — Samples with $T_{ig}$ · (s) > 600 were allowed to go beyond the $T_{ig}$ time.

TABLE 4

Underwriter Laboratory Small Scale
Fire Test Results for Coated Hardboard

| Example | Uncured Coating Wt. (g/ft.$^2$) | Burn Area (square inches) | Burn Time |
|---|---|---|---|
| Ex. 4 | 14 | 12.95 | 0 |
| Ex. 5 | 14 | 0 | 0 |
| Ex. 5 | 28 | 0 | 0 |
| Control (no coating) | — | 15.31 | 60 |

EXAMPLES 7 and 8

A commercial powdered (spray-dried) melamine-formaldehyde resin marketed by Cytec as Aerotru-19 (34.7 wt. %) was mixed with water (10.5 wt. %), n-butanol (2.4 wt. %), a commercial liquid acid cuable PF resin (GP637D52) (2.4 wt. %) and aminotriethanolphosphate acidic phosphorus curing agent (ATP) (50 wt. %). The composition contained about 8% phosphorus by weight. The mixture then was applied as a coating in an amount, respectively, of about 15 and 30 grams of aqueous coating per square feet on an epoxy/glass/NOMEX sandwich panel made by Ciba Composites, Anaheim Calif., (meeting Boeing specification 4-17J). The coated products were tested to measure their OSU heat release (ASTM E-906) and smoke optical density (ASTM E-662) The test results are reported below in Table 5.

EXAMPLE 9

A commercial acid-curable melamine-formaldehyde resin powder (spray dried) marketed by Cytec as Aerotru®-19 was mixed with water (10.5 wt. %), n-butanol (2.4 wt. %), a commercial liquid acid cuable PF resin (GP637D52) (2.4 wt. %) and aminotris(methylene phosphonic acid) (ATMP) (50 wt. %). The composition contained about 9% phosphorous by weight. The mixture then was applied as a coating in an amount of about 27 grams of aqueous coating per square feet on an epoxy/glass/NOMEX sandwich panel made by Ciba Composites, Anaheim Calif., (meeting Boeing specification 4-17J). The coated product was tested to measure its OSU heat release (ASTM E-906) and smoke optical density (ASTM E-662) The test results are reported below in Table 5.

EXAMPLE 10

A commercial liquid, acid-curable melamine-formaldehyde resin (50 wt. % of the composition) marketed by Cytec as Parez®-707, containing 80% resin solids was mixed with aminotriethanol phosphate acidic phosphorus curing agent (ATP) (50 wt. % of the composition). The composition contained about 8% phosphorus by weight. The mixture then was applied as a coating in an amount of about 27 grams of aqueous coating per square feet on an epoxy/glass/NOMEX sandwich panel made by Ciba Composites, Anaheim Calif., (meeting Boeing specification 4-17J). The coated product was tested to measure its OSU heat release (ASTM E-906) and smoke optical density (ASTM E-662) The test results are reported below in Table 5.

EXAMPLE 11

The same commercial melamine-formaldehyde resin, in the same amount, used in Example 11 was mixed with aminotris(methylene phosphonic acid) (ATMP) acidic phosphorus curing agent (50 wt. % of the composition). The composition contained about 9% phosphorus by weight. The mixture then was applied as a coating in an amount of about 27 grams of aqueous coating per square feet on an epoxy/glass/NOMEX sandwich panel made by Ciba Composites, Anaheim Calif., (meeting Boeing specification 4-17J). The coated product was tested to measure its OSU heat release (ASIM E-906) and smoke optical density (ASTM E-662) The test results are reported below in Table 5.

TABLE 5

OSU Heat Release and Smoke Results for
Coated Epoxy/Glass/Nomex Sandwich Panels

| | OSU Heat Release | | | |
| | 2 Minute Heat Release | Peak Release | Smoke Optical Density@ | |
| Coating Example | (kW-min/m$^2$) | (kW/m$^2$) | 90 Seconds | 4 Minutes |
|---|---|---|---|---|
| Ex. 7 | 15 | 35 | 3 | 6 |
| Ex. 8 | 8 | 28 | 3 | 6 |
| Ex. 9 | 6 | 21 | 2 | 7 |
| Ex. 10 | 4 | 21 | 3 | 6 |
| Ex. 11 | 9 | 29 | 4 | 7 |
| Control (no coating) | 57 | 49 | 181 | 212 |

EXAMPLE 12

A commercial liquid, acid-curable melamine-formaldehyde resin (50 wt. % of the composition) marketed by Cytec as Parez®-707, containing 80% resin solids was mixed with aminotriethanol phosphate acidic phosphorus curing agent (ATP) (50 wt. % of the composition). The composition contained about 8% phosphorus by weight. The mixture then was applied as a coating in an amount of about 27 grams of aqueous coating per square feet on a balsawood panel and the coating was cured at 100° C. for 30 minutes. The coated product was tested to measure its OSU heat release (ASTM E-906). The test results are reported below in Table 6.

EXAMPLE 13

A commercial liquid, acid-curable melamine-formaldehyde resin (50 wt. % of the composition) marketed by Cytec as Parez®-707, containing 80% resin solids was mixed with aminotriethanol phosphate acidic phosphorus curing agent (ATP) (50 wt. % of the composition). The composition contained about 8% phosphorus by weight. The mixture then was applied as a coating in an amount of about 27 grams of aqueous coating per square feet on a paper honeycomb substrate and the coating was cured at 100° C. for 30 minutes. The coated product was tested to measure its OSU heat release (ASTM E-906). The test results are reported below in Table 6.

TABLE 6

OSU Heat Release for Coated Balsawood and Paper Honeycomb Substrates

| Coating Example | OSU Heat Release | |
|---|---|---|
| | 2 Minute Heat Release (kW-min/m$^2$) | Peak Release (kW/m$^2$) |
| Ex. 12 | 46 | 100 |
| Control (no coating) | 147 | 147 |
| Ex. 13 | 67 | 70 |
| Control (no coating) | 109 | 280 |

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. An intumescent composition comprising an acid-cured aqueous melamine-formaldehyde resin wherein said resin is cured using a nitrogen-containing acidic phosphorus curing agent containing one or more moieties of the following formula:

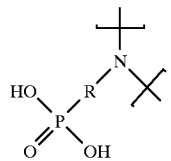

where R is selected from the group consisting of a $C_1$ to $C_6$ alkylene radical, a $C_3$ to $C_7$ cycloalkylene radical, an arylene radical and a divalent radical of the formula:

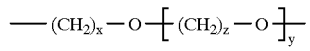

where x and z are integers of 1 to 6, and y is an integer from 0 to 2 and wherein the divalent radical is bonded to the phosphorus atom of said moieties through the terminal oxygen atom of said radical.

2. An aqueous composition suitable for producing a fire resistant coating on a substrate, said composition comprising an acid curable aqueous melamine-formaldehyde resin and a nitrogen-containing acidic phosphorus curing agent containing one or more moieties of the following formula:

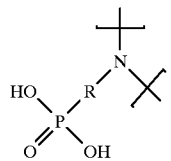

where R is selected from the group consisting of a $C_1$ to $C_6$ alkylene radical, a $C_3$ to $C_7$ cycloalkylene radical, an arylene radical and a divalent radical of the formula:

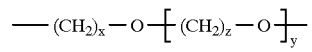

where x and z are integers of 1 to 6, and y is an integer from 0 to 2 and wherein the divalent radical is bonded to the phosphorus atom of said moieties through the terminal oxygen atom of said radical.

3. A method for imparting fire resistance to a substrate comprising treating said substrate with an aqueous composition comprising a water soluble, melamine-formaldehyde resin and a nitrogen-containing acidic phosphorus curing agent containing one or more moieties of the following formula:

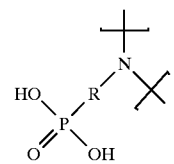

where R is selected from the group consisting of a $C_1$ to $C_6$ alkylene radical, a $C_3$ to $C_7$ cycloalkylene radical, an arylene radical and a divalent radical of the formula:

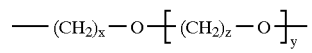

where x and z are integers of 1 to 6, and y is an integer from 0 to 2 and wherein the divalent radical is bonded to the phosphorus atom of said moieties through the terminal oxygen atom of said radical.

4. A fire resistant article comprising a substrate coated with an acid-cured aqueous melamine-formaldehyde resin wherein said resin is cured using a nitrogen-containing acidic phosphorus curing agent containing one or more moieties of the following formula:

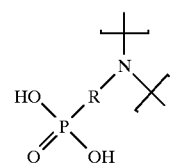

where R is selected from the group consisting of a $C_1$ to $C_6$ alkylene radical, a $C_3$ to $C_7$ cycloalkylene radical, an arylene radical and a divalent radical of the formula:

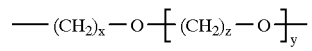

where x and z are integers of 1 to 6, and y is an integer from 0 to 2 and wherein the divalent radical is bonded to the phosphorus atom of said moieties through the terminal oxygen atom of said radical.

5. An intumescent composition comprising an acid-cured aqueous melamine-formaldehyde resin wherein said resin is prepared by reacting melamine with formaldehyde in the presence of an alkaline catalyst at a melamine to formaldehyde mole ratio in the range of 1:1 to 1:6 and said resin is cured using an nitrogen-containing acidic phosphorus curing agent present in an amount of 20 to 100 weight percent of melamine-formaldehyde resin solids, wherein said acidic phosphorus curing agent contains one or more moieties of the following formula:

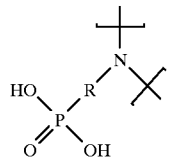

where R is selected from the group consisting of a $C_1$ to $C_6$ alkylene radical, a $C_3$ to $C_7$ cycloalkylene radical, an arylene radical and a divalent radical of the formula:

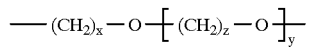

where x and z are integers of 1 to 6, and y is an integer from 0 to 2 and wherein the divalent radical is bonded to the phosphorus atom of said moieties through the terminal oxygen atom of said radical.

6. An aqueous composition suitable for producing a fire resistant coating on a substrate, said composition comprising (i) an acid curable aqueous melamine-formaldehyde resin wherein said resin is prepared by reacting melamine with formaldehyde in the presence of an alkaline catalyst at a melamine to formaldehyde mole ratio in the range of 1:1 to 1:6 and (ii) a nitrogen-containing acidic phosphorus curing agent present in an amount of 20 to 100 weight percent of melamine-formaldehyde resin solids, wherein said acidic phosphorus curing agent contains one or more moieties of the following formula:

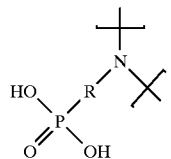

where R is selected from the group consisting of a $C_1$ to $C_6$ alkylene radical, a $C_3$ to $C_7$ cycloalkylene radical, an arylene radical and a divalent radical of the formula:

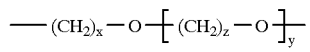

where x and z are integers of 1 to 6, and y is an integer from 0 to 2 and wherein the divalent radical is bonded to the phosphorus atom of said moieties through the terminal oxygen atom of said radical.

7. A fire resistant article comprising a substrate coated with an acid-cured aqueous melamine-formaldehyde resin wherein said resin is prepared by reacting melamine with formaldehyde in the presence of an alkaline catalyst at a melamine to formaldehyde mole ratio in the range of 1:1 to 1:6 and wherein said resin is cured using a nitrogen-containing acidic phosphorus curing agent present in an amount of 20 to 100 weight percent of melamine-formaldehyde resin solids, said acidic phosphorus curing agent containing one or more moieties of the following formula:

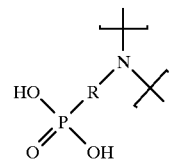

where R is selected from the group consisting of a $C_1$ to $C_6$ alkylene radical, a $C_3$ to $C_7$ cycloalkylene radical, an arylene radical and a divalent radical of the formula:

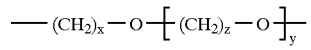

where x and z are integers of 1 to 6, and y is an integer from 0 to 2 and wherein the divalent radical is bonded to the phosphorus atom of said moieties through the terminal oxygen atom of said radical.

8. The intumescent composition of claim 1 or the aqueous composition of claim 2 or the method of claim 3 or the article of claim 4 wherein the nitrogen-containing acidic phosphorus curing agent is a compound of the following formula:

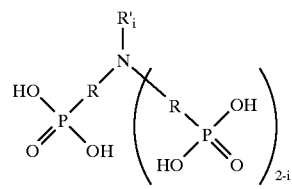

where R is selected from the group consisting of a $C_1$ to $C_6$ alkylene radical, a $C_3$ to $C_7$ cycloalkylene radical, an arylene radical and a divalent radical of the formula:

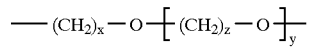

where x and z are integers of 1 to 6, and y is an integer from 0 to 2 and wherein the divalent radical is bonded to the phosphorus atoms of said compound through the terminal oxygen atom of said radical and where i is either 0 or 1, and R' is selected from hydrogen, a $C_1$ to $C_6$ alkyl, a $C_1$ to $C_6$ alkoxy, a cycloalkyl, and an aryl.

9. The intumescent composition of claim 1 or the aqueous composition of claim 2 or the method of claim 3 or the article of claim 4 wherein the nitrogen-containing acidic phosphorus curing agent is a compound of the following formula:

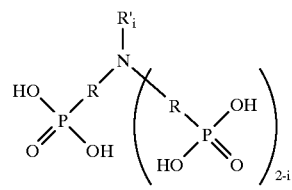

where R is selected from the group consisting of a $C_1$ to $C_6$ alkylene radical, a $C_3$ to $C_7$ cycloalkylene radical, an arylene radical and a divalent radical of the formula:

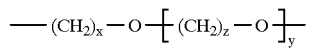

where x and z are integers of 1 to 6, and y is an integer from 0 to 2 and wherein the divalent radical is bonded to the phosphorus atoms of said compound through the terminal oxygen atom of said radical and where i is either 0 or 1, and R' is selected from hydrogen, a $C_1$ to $C_6$ alkyl, a $C_1$ to $C_6$ alkoxy, a cycloalkyl, and an aryl, and wherein the melamine-formaldehyde resin is prepared by reacting melamine and formaldehyde in an aqueous reaction medium under an alkaline condition at a melamine to formaldehyde mole ratio in the range of 1:1 to 1:6.

10. The intumescent composition of claim 1 or the aqueous composition of claim 2 or the method of claim 3 or the article of claim 4 wherein the melamine-formaldehyde resin is prepared by reacting melamine and formaldehyde in an aqueous reaction medium under an alkaline condition at a melamine to formaldehyde mole ratio in the range of 1:1 to 1:6 and wherein the nitrogen-containing acidic phosphorus curing agent is selected from the group consisting of aminotriethanol phosphate and aminotris(methylenephosphonic acid).

11. The intumescent composition of claim 1 or the aqueous composition of claim 2 or the method of claim 3 or the article of claim 4 wherein the nitrogen-containing acidic phosphorus curing agent is a compound of the following formula:

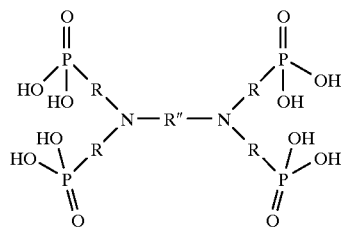

where R is selected from the group consisting of a $C_1$ to $C_6$ alkylene radical, a $C_3$ to $C_7$ cycloalkylene radical, an arylene radical and a divalent radical of the formula:

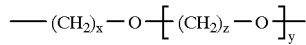

where x and z are integers of 1 to 6, and y is an integer from 0 to 2 and wherein the divalent radical is bonded to the phosphorus atoms of said compound through the terminal oxygen atom of said radical and where i is either 0 or 1, and R' is selected from hydrogen, a $C_1$ to $C_6$ alkyl, a $C_1$ to $C_6$ alkoxy, a cycloalkyl, and an aryl and where R" is a divalent organic radical.

12. The intumescent composition of claim 1 or the aqueous composition of claim 2 or the method of claim 3 or the article of claim 4 wherein the nitrogen-containing acidic phosphorus curing agent is a compound of the following formula:

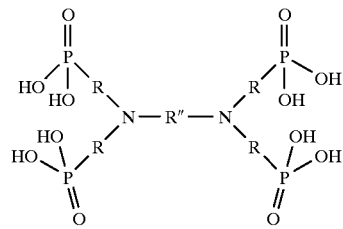

where R is selected from the group consisting of a $C_1$ to $C_6$ alkylene radical, a $C_3$ to $C_7$ cycloalkylene radical, an arylene radical and a divalent radical of the formula:

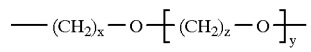

where x and z are integers of 1 to 6, and y is an integer from 0 to 2 and wherein the divalent radical is bonded to the phosphorus atoms of said compound through the terminal oxygen atom of said radical and where R" is a divalent organic radical and wherein the melamine-formaldehyde resin is prepared by reacting melamine and formaldehyde in an aqueous reaction medium under an alkaline condition at a melamine to formaldehyde mole ratio in the range of 1:1 to 1:6.

13. The intumescent composition of claim 1 or the aqueous composition of claim 2 or the method of claim 3 or the article of claim 4 wherein the melamine-formaldehyde resin is prepared by reacting melamine and formaldehyde in an aqueous reaction medium under an alkaline condition at a melamine to formaldehyde mole ratio in the range of 1:1 to 1:6 and wherein the nitrogen-containing acidic phosphorus curing agent is ethylenediaminetetra(methylene phosphonic acid).

14. The intumescent composition of claim 1 or the aqueous composition of claim 2 or the method of claim 3 or the article of claim 4 wherein the nitrogen-containing acidic phosphorus curing agent is a compound of the following formula:

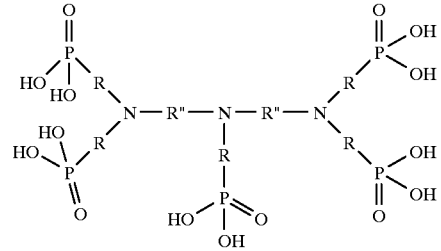

where R is selected from the group consisting of a $C_1$ to $C_6$ alkylene radical, a $C_3$ to $C_7$ cycloalkylene radical, an arylene radical and a divalent radical of the formula:

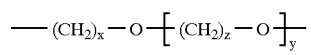

where x and z are integers of 1 to 6, and y is an integer from 0 to 2 and wherein the divalent radical is bonded to the phosphorus atoms of said compound through the terminal oxygen atom of said radical and where R" is a divalent organic radical.

15. The intumescent composition of claim 1 or the aqueous composition of claim 2 or the method of claim 3 or the article of claim 4 wherein the nitrogen-containing acidic phosphorus curing agent is a compound of the following formula:

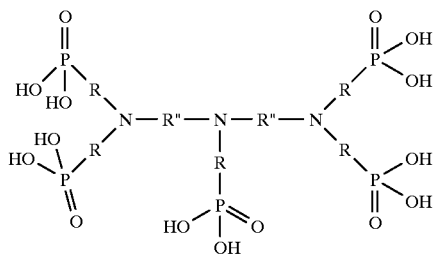

where R is selected from the group consisting of a $C_1$ to $C_6$ alkylene radical, a $C_3$ to $C_7$ cycloalkylene radical, an arylene radical and a divalent radical of the formula:

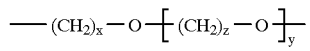

where x and z are integers of 1 to 6, and y is an integer from 0 to 2 and wherein the divalent radical is bonded to the phosphorus atoms of said compound through the terminal oxygen atom of said radical and where R" is a divalent organic radical and wherein the melamine-formaldehyde resin is prepared by reacting melamine and formaldehyde in an aqueous reaction medium under an alkaline condition at a melamine to formaldehyde mole ratio in the range of 1:1 to 1:6.

16. The intumescent composition of claim 1 or the aqueous composition of claim 2 or the method of claim 3 or the article of claim 4 wherein the melamine-formaldehyde resin is prepared by reacting melamine and formaldehyde in an aqueous reaction medium under an alkaline condition at a melamine to formaldehyde mole ratio in the range of 1:1 to 1:6 and wherein the nitrogen-containing acidic phosphorus curing agent is selected from the group consisting of diethylenetriaminepenta(methylene phosphonic acid) and bis hexamethylenetriaminepenta(methylene phosphonic acid).

17. The intumescent composition of claim 1 or the aqueous composition of claim 2 or the method of claim 3 or the article of claim 4 where R is a divalent radical of the formula:

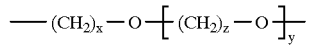

where x and z are integers of 1 to 6, and y is an integer from 0 to 2 and wherein the divalent radical is bonded to the phosphorus atom of said moieties through the terminal oxygen atom of said radical.

18. The composition, method or article of claim 17 wherein the nitrogen-containing acidic phosphorus curing agent is a compound of the following formula:

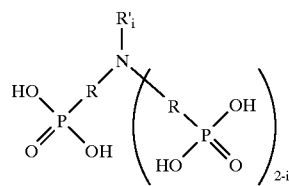

where i is either 0 or 1, and R' is selected from hydrogen, a $C_1$ to $C_6$ alkyl, a $C_1$ to $C_6$ alkoxy, a cycloalkyl, and an aryl.

19. The composition, method or article of claim 18 wherein the aqueous melamine-formaldehyde resin is prepared by reacting melamine and formaldehyde in an aqueous reaction medium under an alkaline condition at a melamine to formaldehyde mole ratio in the range of 1:1 to 1:6.

20. The composition, method or article of claim 19 wherein the nitrogen-containing acidic phosphorus curing agent is aminotriethanol phosphate.

21. The composition, method or article of claim 17 wherein the nitrogen-containing acidic phosphorus curing agent is a compound of the following formula (II):

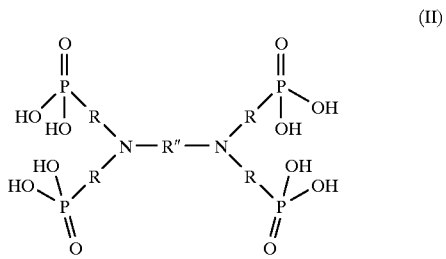

where R" is a divalent organic radical.

22. The composition, method or article of claim 21 wherein the aqueous melamine-formaldehyde resin is prepared by reacting melamine and formaldehyde in an aqueous reaction medium under an alkaline condition at a melamine to formaldehyde mole ratio in the range of 1:1 to 1:6.

23. The composition, method or article of claim 17 wherein the nitrogen-containing acidic phosphorus curing agent is a compound of the following formula (III):

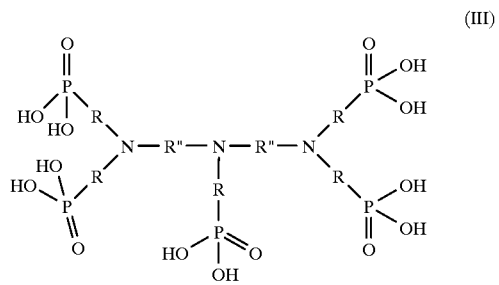

where R" is a divalent organic radical.

24. The composition, method or article of claim 23 wherein the aqueous melamine-formaldehyde resin is prepared by reacting melamine and formaldehyde in an aqueous reaction medium under an alkaline condition at a melamine to formaldehyde mole ratio in the range of 1:1 to 1:6.

25. A method for imparting fire resistance to a substrate comprising treating said substrate with an aqueous composition comprising (i) a water soluble, melamine-formaldehyde resin wherein said resin is prepared by reacting melamine with formaldehyde in the presence of an alkaline catalyst at a melamine to formaldehyde mole ratio in the range of 1:1 to 1:6 and (ii) a nitrogen-containing acidic phosphorus curing agent present in an amount of 20 to 100 weight percent of melamine-formaldehyde resin solids, wherein said acidic phosphorus curing agent contains one or more moieties of the following formula:

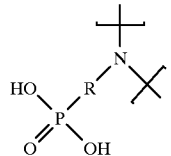

where R is selected from the group consisting of a $C_1$ to $C_6$ alkylene radical, a $C_3$ to $C_7$ cycloalkylene radical, an arylene radical and a divalent radical of the formula:

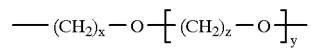

where x and z are integers of 1 to 6, and y is an integer from 0 to 2 and wherein the divalent radical is bonded to the phosphorus atom of said moieties through the terminal oxygen atom of said radical.

* * * * *